United States Patent [19]
Gallagher et al.

[11] Patent Number: 5,213,272
[45] Date of Patent: May 25, 1993

[54] ENVIRONMENTAL NON-POWERED PAIL TYPE TRASH CONTAINER

[76] Inventors: Denis Gallagher, P.O. Box 944, Captain Cook, Hi. 56704; Richard A. Swetz, 28 Barker St., Apartment 1G, Mount Kisco, N.Y. 10549

[21] Appl. No.: 913,930

[22] Filed: Jul. 17, 1992

Related U.S. Application Data

[63] Continuation-in-part of Ser. No. 729,362, Jul. 12, 1991, Pat. No. 5,139,205.

[51] Int. Cl.$^5$ ............................................. B02C 9/04
[52] U.S. Cl. ........................................ 241/33; 241/69; 241/79; 241/99; 241/DIG. 38
[58] Field of Search ................ 241/33, 69, 79, 99, 241/100, 101.2, DIG. 38

[56] References Cited

U.S. PATENT DOCUMENTS

| | | |
|---|---|---|
| 1,095,521 | 6/1978 | Hauptman . |
| 2,190,971 | 2/1940 | Bordeker ........................ 241/99 X |
| 3,104,069 | 9/1963 | Ferguson ........................ 241/69 X |
| 3,353,478 | 11/1967 | Hopkins . |
| 3,540,495 | 12/1967 | Lundgren . |
| 3,772,984 | 11/1973 | Karis et al. . |
| 3,831,513 | 8/1974 | Tashman . |
| 3,841,214 | 10/1974 | Engebretsen . |
| 3,859,908 | 1/1975 | Karis et al. . |
| 3,859,911 | 1/1975 | Karis et al. . |
| 3,905,289 | 9/1975 | Engebretsen . |
| 3,908,538 | 9/1975 | Boyd . |
| 3,938,433 | 2/1976 | Borum . |
| 3,962,964 | 6/1976 | Engebretsen . |
| 4,073,229 | 2/1978 | O'Rourke et al. . |
| 4,119,027 | 10/1978 | Elders . |
| 4,147,100 | 4/1979 | Dykstra . |
| 4,241,652 | 12/1980 | Smedlund . |
| 4,463,669 | 7/1984 | Van Doorn et al. . |
| 4,620,479 | 11/1986 | Diamond et al. . |
| 5,167,184 | 12/1992 | Rebecchi ........................ 241/99 X |

FOREIGN PATENT DOCUMENTS 18487 of 1902 United Kingdom ................ 241/99

Primary Examiner—Douglas D. Watts
Attorney, Agent, or Firm—Birch, Stewart, Kolasch & Birch

[57] ABSTRACT

A segregated waste disposal device is disclosed which includes a plurality of waste receptacles provided in a main housing, each of the plurality of waste receptacles receiving one of a plurality of distinct waste products, respectively, including glass and metal. An opening within the main housing receives at least one of the glass and metal waste, and the weighted lid connected to the main housing crushes waste deposited into the opening. The lid may be opened either by hydraulic or mechanical spring mechanisms and a grate member provided within the opening and beneath the weighted lid allows crushed glass to free-fall therethrough into a predetermined receptacle. A sweep arm sweeps remaining crushed waste off of the grate into a waste receptacle other than a waste receptacle containing crushed glass.

9 Claims, 4 Drawing Sheets

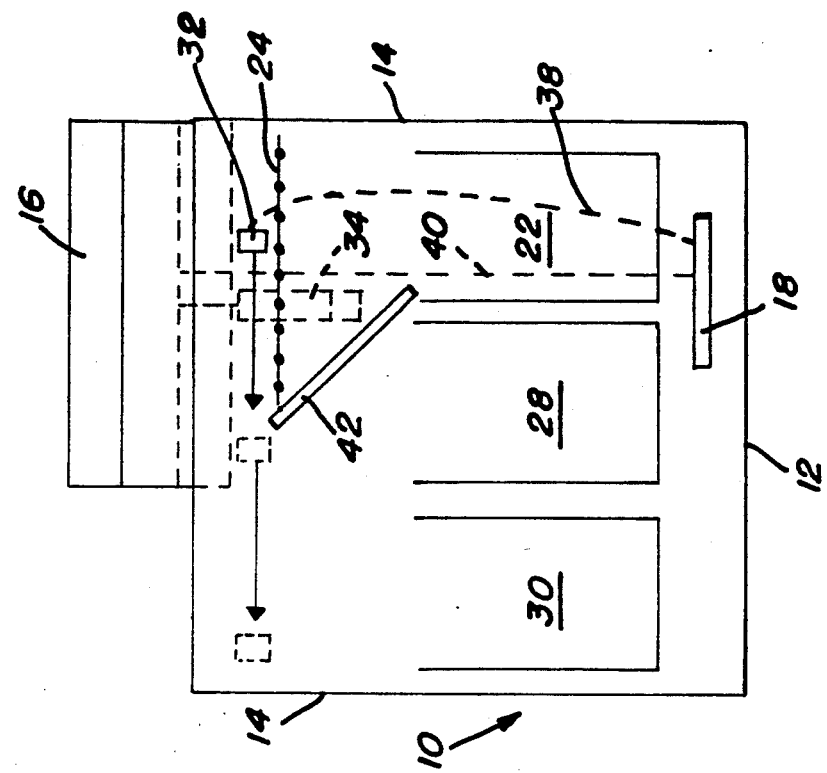
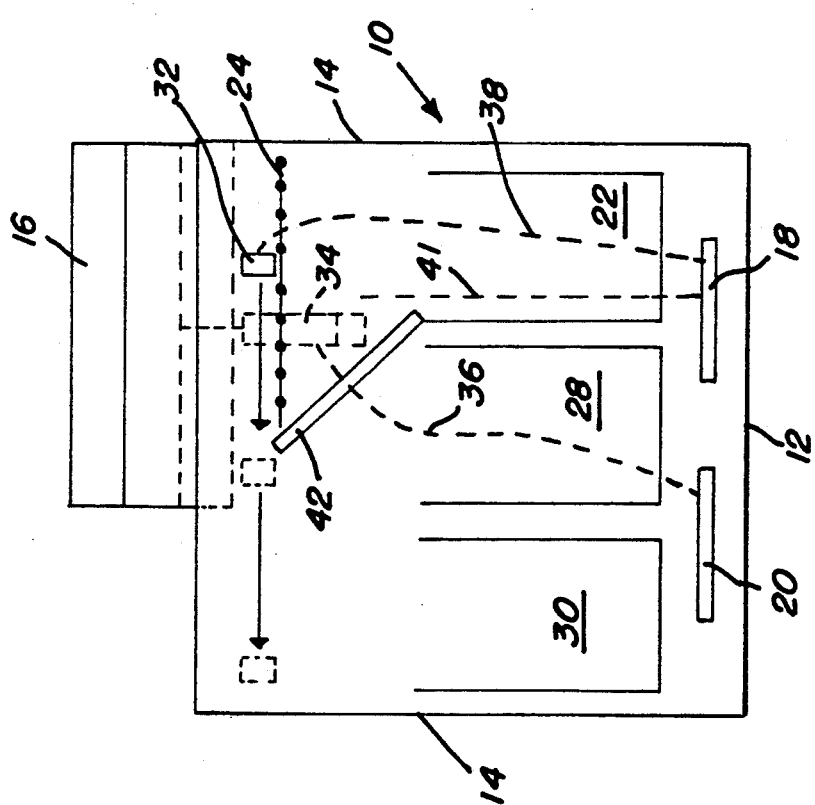
FIG. 5
FIG. 4

ENVIRONMENTAL NON-POWERED PAIL TYPE TRASH CONTAINER

This application is a continuation-in-part of application Ser. No. 07/729,362 filed on Jul. 12, 1991, now U.S. Pat. No. 5,139,205.

BACKGROUND OF THE INVENTION

1. Field of the Invention

The present invention is directed to a segregated waste disposal system, and more particularly to a segregated waste disposal system for separating and storing recyclable waste in a plurality of respective storage containers.

2. Description of Related Art

In recent years, there has been a widespread trend toward cleaning up the environment. At an initial level, this trend has begun with the residential and office movement of recycling. In some areas recycling is a voluntary project, while other areas require recycling as a prerequisite to curbside trash removal. Many people perceive recycling to be a nuisance, since the separation of items of trash into a plurality or respective storage containers can be an inconvenience. The previous need for only one trash receptacle for all types of waste as compared to several receptacles, depending upon the number and type of separate of items, can present severe storage and space problems for most people, thereby influencing and reducing their recycling participation.

Accordingly, a need in the art exists for a segregated waste disposal system of a non-powered pail type which is compact in nature and efficiently segregates known recyclable materials into easily disposable compartments.

OBJECTS AND SUMMARY OF THE INVENTION

A primary object of the present invention is to provide a segregated waste disposal device.

Another object of the present invention is to provide a segregated waste disposal device which is easy to operate, requires no electrical components, and is compact in size.

These and other objects of the present invention are fulfilled by providing a segregated waste disposal device comprising a main housing; a plurality of waste receptacles provided in said main housing, each of said plurality of waste receptacles receiving one of a plurality of distinct waste products, respectively, including glass and metal; an opening within said main housing for receiving at least one of glass and metal waste; a weighted lid connected to said main housing for crushing waste deposited into said opening; means for selectively opening and closing said weighted lid; and means for distributing crushed waste to selected ones of said plurality of containers, said means for distributing including a grate member provided within said opening and beneath said weighted lid, said weighted lid crushing waste against said grate member, deflector means for directing crushed glass into a predetermined one of said plurality of said waste receptacles, and a sweep arm for sweeping remaining crushed waste off of said grate into a waste receptacle other than a waste receptacle containing crushed glass.

The segregated waste disposal device can operate either by means of a spring mechanism connected to the main housing in the lid and actuable by a rod connected to the foot pedal, or an actuation of a first foot pedal which pushes the rod upward thereby expanding the spring mechanism against its normal bias and release of the foot pedal enables the normal bias of the spring to pull the weighted lid down against the grate member and in combination with the weight of the weighted lid, crush the waste inserted into the opening.

Still further, there may be included a hydraulic lift member as opposed to the spring mechanism, the hydraulic lift member being connected to the main housing in the lid and connected to each of the first and second foot pedals by first and second hydraulic hoses, respectively, wherein depression of the first foot pedal hydraulically lifts the weighted lid and depression of the second foot pedal releases the hydraulically lifted and weighted lid.

Still further, there may be any plurality of bins as necessary for recycling purposes.

Further scope of applicability of the present invention will become apparent from the detailed description given hereinafter. However, it should be understood that the detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 4 is a front schematic representation of the waste disposal device according to the present invention incorporating a hydraulic lid lifting mechanism and three waste receptacle bins;

FIG. 5 is a front schematic representation of still another embodiment of the present invention utilizing a spring mechanism to lift the weighted lid and including three waste receiving bins;

DETAILED DESCRIPTION OF THE PREFERRED EMBODIMENTS

Figure 1:
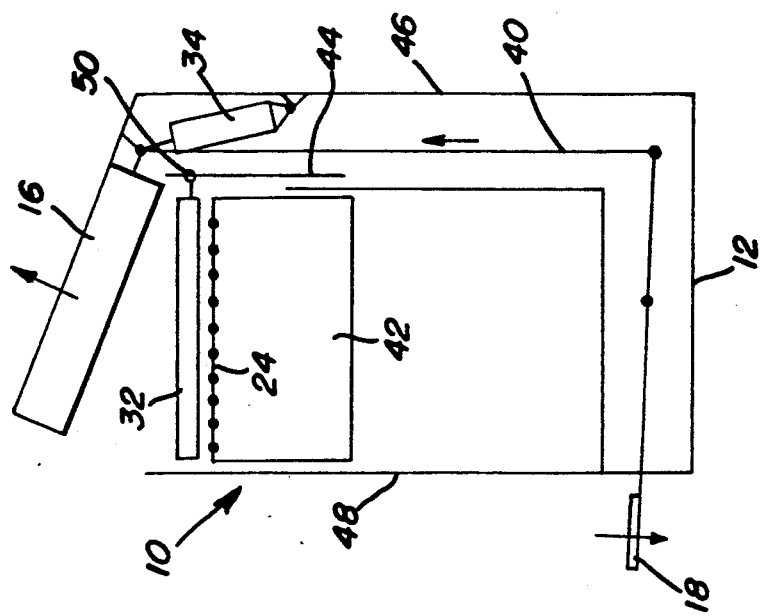
FIG. 1 is a side schematic representation of a segregated waste disposal system of the present invention.

Referring in general to FIG. 1, there is shown a side schematic representation of a waste disposal device according to one preferred embodiment of the present invention.

The waste disposal device is generally shown at numeral 10 and includes a base 12, a front 48, and rear 46 wall members with a lid 16 mechanically liftable away from the device 10 to reveal a grate member 24 upon which waste may be placed.

Also provided in connection with each of the disclosed embodiments is at least a first foot pedal 18 also identified as a load pedal which is in turn connected to a rod extending from the foot pedal 18 up to a lid actuator 34. The lid actuator 34 is connected to the rear wall 46 and the lid 16 by means of connecting pieces of any known type which will securely connect the lid actuator 34 to both the lid 16 and the rear wall 46 of the housing 10. In the embodiment shown in FIG. 1, the lid actuator 34 is a spring mechanism whose normally biased and contracted state is such as to hold the lid 16 securely in a closed position against the housing 10 unless expanded, from its contracted state by actuation of the rod 40 connected to the load pedal 18.

Figure 2:
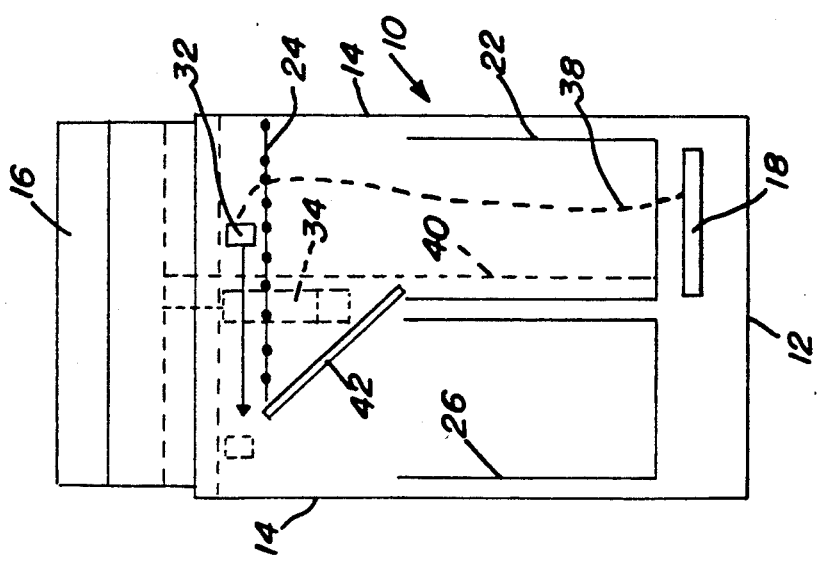
FIG. 2 is a front schematic representation of the waste disposal device shown in FIG. 1.

As additionally shown in FIG. 2, there is provided a deflection plate 42 beneath the grate 24 such that waste placed on grate 24 will be deflected into a first glass bin 22 if the waste is of such a material which may be crushed into particles for free-fall through the grate 24.

There is additionally provided a sweep arm 32 spanning the entire width of the grate member 24 as shown in the side view of FIG. 1 such that any material which is not crushed and able to free-fall through the grate 24 may be swept to the side for deposition into a metals bin 26. It should be noted that although the second bin 26 is intended primarily for receipt of metals, it may also be utilized for any other alternative non-breakable waste material, including paper, which may be swept easily to the side by the sweep arm 32. As is also shown in FIG. 2, the sweep arm 32 is connected to the foot pedal 18 by a cable 38 such that the sweep arm 32 may be activated by any suitable means. For example, depression of pedal 18 will advance a mechanical linkage arm (not shown) connected to the sweep arm 38. A spring (not shown) will normally retain the sweep arm 38 in a home position until the retracted state thereof is overcome by the mechanical linkage arm. The normal bias of the spring will subsequently retract the sweep arm 38 to the home position upon release of the pedal 18. If necessary, the sweep arm may alternatively be activated by battery power or the like. The purpose, however, of the invention is to maintain a non-powered, i.e. completely mechanical device. It is intended that the segregated waste disposal device of the present invention is essentially non-powered and hence transportable for use at virtually any location, and as such any actuation of the parts therein must be purely mechanical or preferably battery powered, as mentioned. The sweep arm 32 is slidable along a rear wall 44 which is a partial rear wall spanning an upper rear portion of the main rear wall 46 and connected by soldering or the like to sidewalls 14. Formed within this partial rear wall 44 is a groove or track 50 along which the sweep arm 32 may slide. Upon reaching the limits of the sweeping motion, the sweep arm is bounced back toward its initial starting position for sweeping of any further waste in a subsequent operation.

Accordingly, it should be understood that the weight of lid 16 along with the natural bias of spring mechanism in the lid actuator 34 will sufficiently crush any waste material placed on grate 24 between the grate 24 and the lid 16. Waste will thus be either disposed of by freefall through the grate 24 if the waste is a crushable glass material, or by being swept to an adjacent bin 26 for deposition therein. Deflector plate 42 is positioned so as to direct all crushed material into the first bin 22 thereby preventing any additional waste from entering the adjacent bin 26 other than by actuation of the sweep arm 32.

Figure 3:
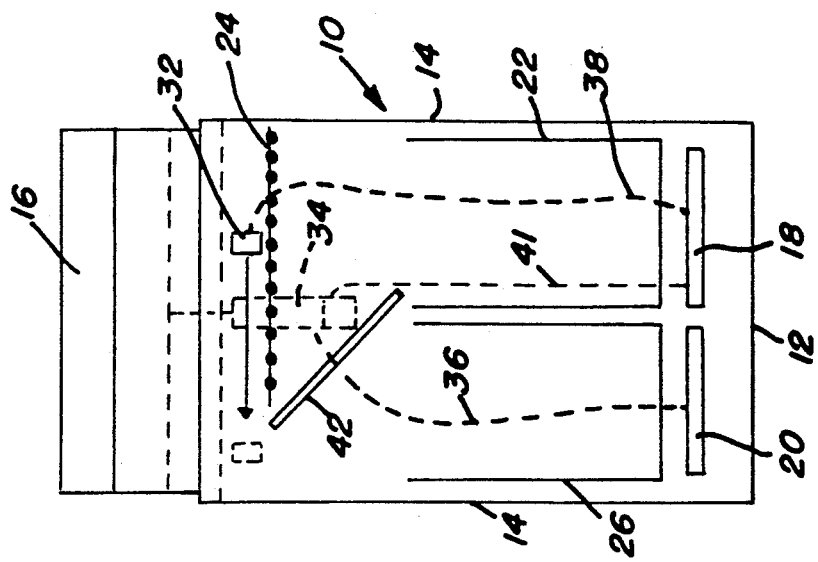
FIG. 3 is a front schematic representation of a waste disposal device according to the present invention which utilizes a hydraulic lid lifting mechanism.

As shown in FIG. 3, it is also contemplated that the lid actuator 34 may be a hydraulically actuated lift mechanism. In this case, it is necessary to provide both a load pedal 18 and a release pedal 20, the load pedal 18 including a first hydraulic hose member 41 connected to the hydraulically actuated lift mechanism 34 and a second hydraulic hose 36 connected to the release pedal 20. Upon depression of the load pedal 18, hydraulic fluid is supplied to the hydraulic cylinder/lid actuator 34, thereby opening the lid 16 similar to that achieved by the spring mechanism described in connection with the first embodiment. The lid will remain open until the release pedal 20 is depressed, which will release hydraulic fluid from the hydraulically actuated cylinder/lid actuator 34 thereby enabling the lid 16 to lower and crush waste deposited on the grate 24. The operation of FIG. 3 is the same as that described above in connection with FIGS. 1 and 2. It should be understood that the sweeping action of sweep arm 32 occurs only upon raising of the lid 16, but that the glass or crushed materials will immediately free-fall through the grate 24. Thus, when the lid 16 is raised by depression of the load pedal 18, any remaining debris which is in a crushed state will be swept to the side and deposited into the adjacent metals bin 26. The user must wait for return of the sweep arm 32 prior to placing any additional recyclable waste material onto the grate 24 for a subsequent crushing operation.

FIG. 4 is a front schematic representation of a segregated waste disposal device according to still another preferred embodiment of the present invention. In the arrangement shown in FIG. 4 there are three recyclable materials bins including a glass bin 22, a steel/tin bin 28, and an aluminum bin 30. In addition, the sweep arm 32 when actuated to sweep debris remaining on the grate member 24 will also activate an electromagnet therein such that as the sweep arm 32 sweeps across the grate 24, aluminum waste would immediately fall into the first bin 28. However, steel and tin will adhere to the sweep arm due to the magnetic field created by the electromagnet. The sweep arm will continue to move to the left as shown in FIGS. 4 and 5 until the sweep arm 32 is positioned above the bin 30. The electromagnet is then deactivated, allowing steel/tin waste to fall into the bin. Glass will fall into the first receptacle 22 as described above. All remaining parts operate similar to that explained above in connection with FIG. 3 wherein the lid actuator 34 is hydraulically actuated and connected to load pedal 18 by hydraulic hose 41 and connected to load release pedal 20 by hydraulic hose 36.

FIG. 5 is a front schematic representation of still another embodiment of the present invention in which three separate bins are utilized. FIG. 5 is similar to the operation of FIG. 2 in that the lid actuator 34 is a spring mechanism whose normal bias is counteracted by depression of the load pedal 18 such that rod 40 will extend the spring and lift lid 16 away from the main housing 10. All remaining operations are similar to that described in connection with FIG. 4 as FIG. 5 also includes the electromagnet housed in sweep arm 32 so that additional separation of materials such as separation of aluminum from steel/tin may be achieved in the recycling process.

Figure 6:
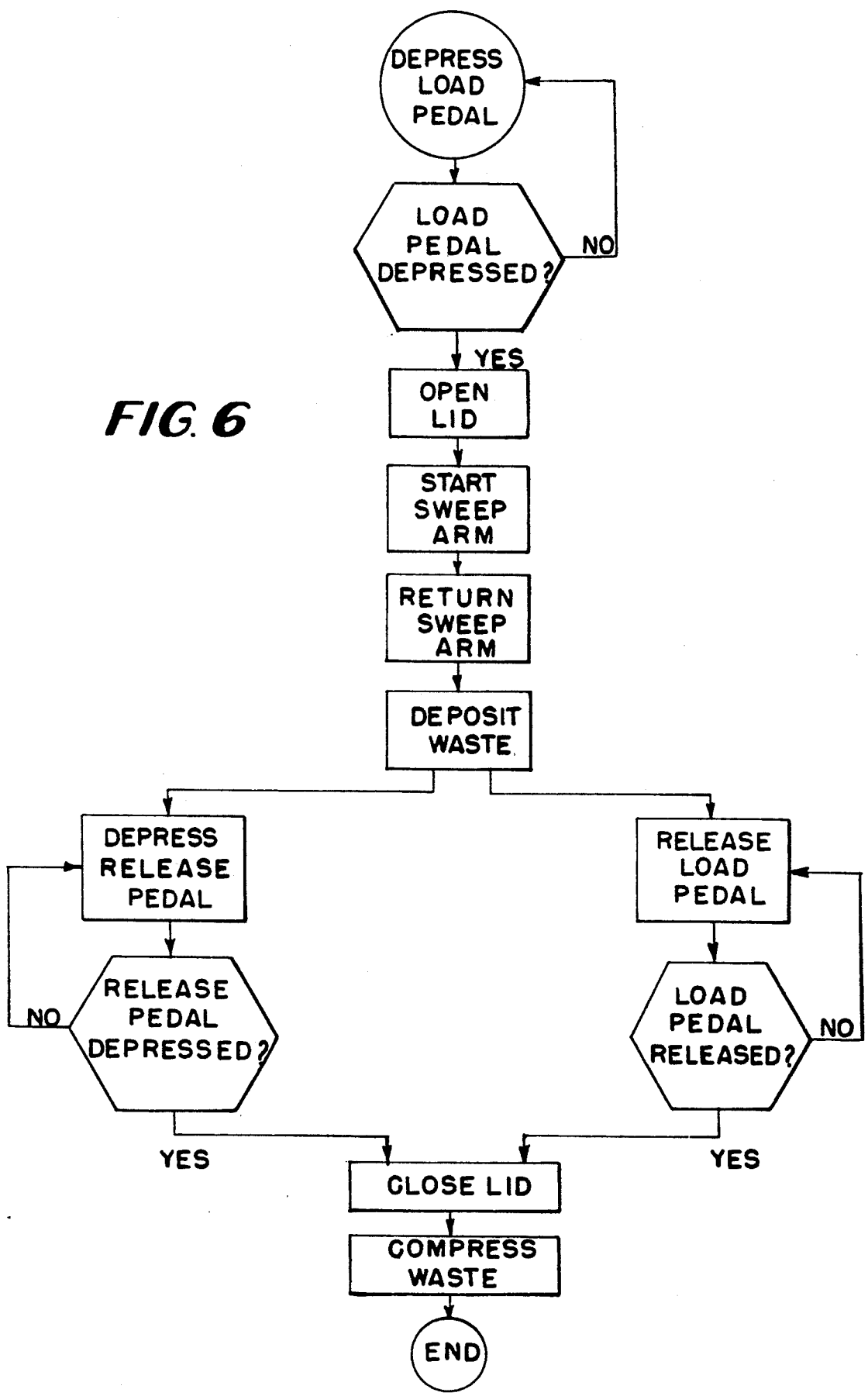
FIG. 6 is a flow chart explaining operation of the present invention.
Figure 7:
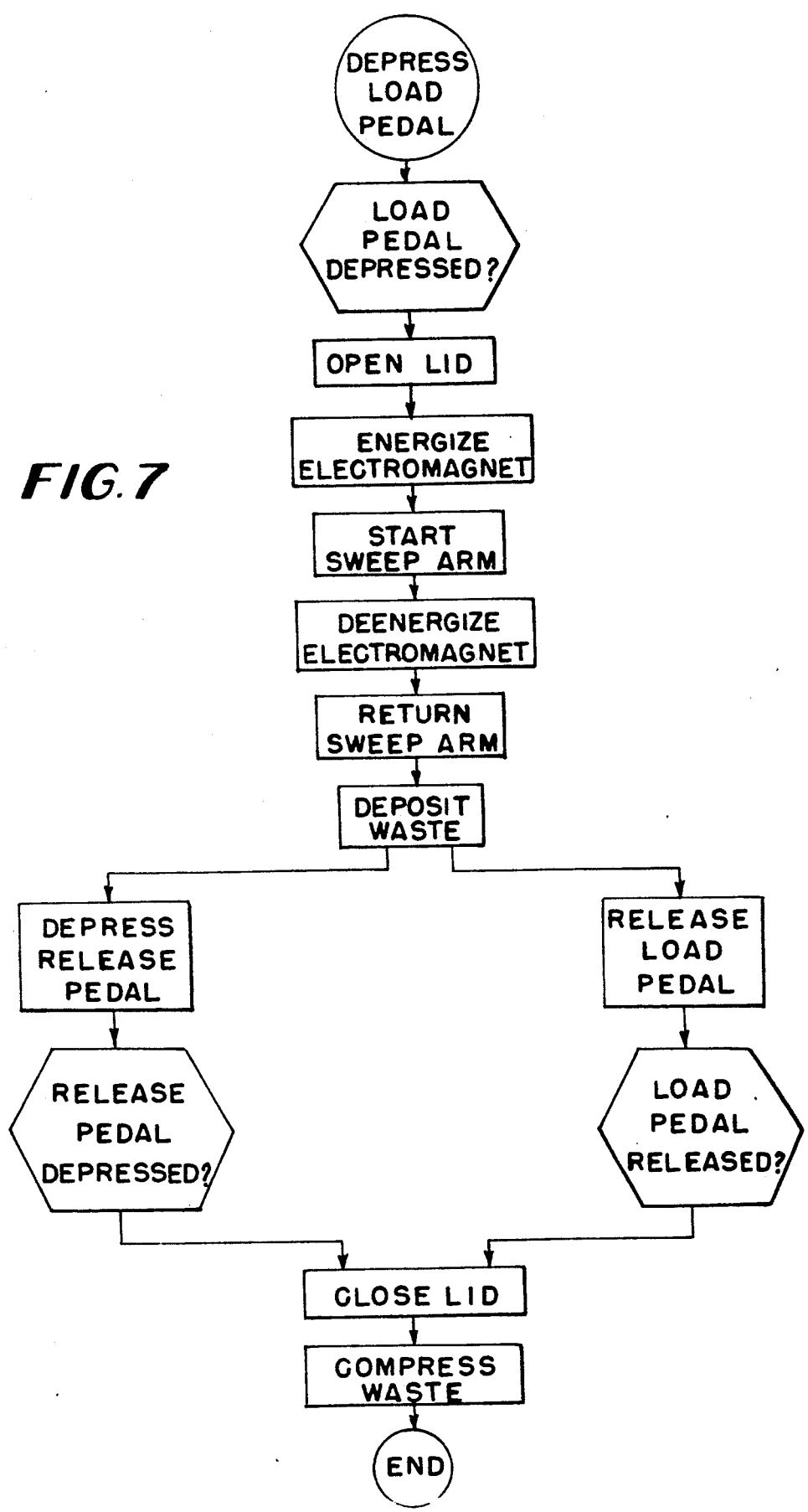
FIG. 7 is a flow chart showing operation of the present invention with the inclusion of an electromagnet therein.

Each of FIGS. 6 and 7 explain a sequence of operation which occurs in the embodiments shown above. Specifically, depression of the load pedal must first occur and upon depression of the load pedal, the lid 16 is opened. It is then necessary to deposit waste and depress the release pedal if available. Once the release pedal is depressed, or alternatively, once the load pedal is released, the lid closes and waste is compressed. Once the lid is again lifted, the sweep arm is activated to sweep remaining debris into selected bins. Upon return of the sweep arm, the cycle is completed and additional waste may be deposited into the apparatus.

As alternatively shown in FIG. 7, if the device includes an electromagnet, the electromagnet is energized at a predetermined position in the sequence of events in order to selectively deposit aluminum and steel/tin into respective bins.

Accordingly, the device of the present invention will compact and separate metal and glass waste. The bins can be permanent, disposable or lined and sensors may be additionally utilized to detect if the bins are full. The unit is envisioned as the size of a standard kitchen garbage pail, is non-powered by electric power and is convenient to use while satisfying the trend towards recycling of all materials.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A segregated waste disposal device comprising:
a main housing;
a plurality of waste receptacles provided in said main housing, each of said plurality of waste receptacles receiving one of a plurality of distinct waste products, respectively, including glass and metal;
an opening within said main housing for receiving at least one of glass and metal waste;
a weighted lid connected to said main housing for crushing waste deposited into said opening;
means for selectively opening and closing said weighted lid; and
means for distributing crushed waste to selected ones of said plurality of containers, said means for distributing including
a grate member provided within said opening beneath said weighted lid, said weighted lid crushing waste against said grate member,
deflector means for directing crushed glass into a predetermined one of said plurality of waste receptacles, and
a sweep arm for sweeping remaining crushed waste off of said grate into a waste receptacle other than a waste receptacle containing crushed glass.

2. The segregated waste disposal device according to claim wherein said means for selectively opening and closing said weighted lid includes a foot pedal for lifting said weighted lid upon depression thereof and for releasing said weighted lid upon release of said foot pedal.

3. The segregated waste disposal device according to claim 1, further including a spring mechanism connected to said main housing and said lid and actuable by a rod connected to said foot pedal, wherein actuation of said first foot pedal pushes the rod upward thereby expanding said spring mechanism against its normal bias and release of said foot pedal enables the normal bias of said spring to pull said weighted lid down against said grate member and in combination with the weight of said weighted lid, crush the waste inserted into the opening.

4. The segregated waste disposal device according to claim 1, wherein said means for selectively opening and closing said weighted lid includes a first pedal for lifting said weighted lid and a second pedal for releasing the raised weighted lid.

5. The segregated waste disposal device according to claim 4, further including a hydraulic lift member connected to said main housing and said lid and connected to each of the first and second foot pedals by first and second hydraulic hoses, respectively, wherein depression of the first foot pedal hydraulically lifts said weighted lid and depression of the second foot pedal releases said hydraulically lifted and weighted lid.

6. The segregated waste disposal device according to claim 1, 2, 3 or 4, wherein crushed glass material will free-fall through said grate member into a glass receiving receptacle.

7. The segregated waste disposal device according to claim 1, 2, 3 or 4, wherein said sweep arm clears crushed waste from the surface of said grate member into a bin other than a glass receiving receptacle.

8. The segregated waste disposal device according to claims 1, 2, 3, or 4, wherein said sweep arm includes a selectively actuable electromagnet, said electromagnet, upon activation thereof, attracting metals having steel and tin in their composition and upon deactivation thereof depositing previously attracted metals into a selected receptacle.

9. The segregated waste disposal device according to claims 1, 2, 3, or 4, wherein said plurality of waste receptacles are provided as individual removable units within said main housing.

* * * * *